United States Patent [19]
Roslonski

[11] Patent Number: 5,894,814
[45] Date of Patent: Apr. 20, 1999

[54] PORTABLE PEST DETERRENT GUARD FOR BIRD FEEDERS

[76] Inventor: Donald J. Roslonski, 38 Fairview Ave., Brick, N.J. 08723

[21] Appl. No.: 08/943,101

[22] Filed: Aug. 28, 1997

Related U.S. Application Data

[60] Provisional application No. 60/024,231, Sep. 30, 1996.

[51] Int. Cl.⁶ .................................................. A01K 39/01
[52] U.S. Cl. .......................................... 119/57.9; 119/52.3
[58] Field of Search ................................ 119/52.3, 57.9

[56] References Cited

U.S. PATENT DOCUMENTS 2,856,898  10/1958  Doubleday et al. ................ 119/57.9
5,111,772   5/1992  Lipton ................................ 119/57.9
5,471,951  12/1995  Collins ........................... 119/52.3 X

*Primary Examiner*—Robert P. Swiatek
*Attorney, Agent, or Firm*—Clifford G. Frayne

[57] ABSTRACT

A hanger harp formed of metal tubing having an upper tubing surface and an upstanding hook affixed thereto and a downwardly depending hook affixed thereto, the downwardly depending hook for positioning of a bird feeder, the harp hanger having a battery source secured thereto and connected to the harp hanger and the bird feeder, such that the distance between the hanger harp and the bird feeder would be bridged by an animal larger than a bird, and thus present an electrical shock to this animal thereby deterring this animal from invading the food supply designated for the birds.

3 Claims, 2 Drawing Sheets

PORTABLE PEST DETERRENT GUARD FOR BIRD FEEDERS

This application is based on a provisional application Serial No. 60/024,231 filed Sept. 30, 1996.

BACKGROUND OF THE INVENTION

1. Field of the Invention

The present invention relates to bird feeders, and more particularly, to a guard adapted to fit a plurality of different types of bird feeders which is electrically powered in order to shock squirrels, larger birds or animals which often eat food intended for smaller birds.

2. Description of the Prior Art

Squirrels can consume large quantities of food very rapidly and their aggressive nature intimidates the more passive birds and large aggressive birds discourage smaller birds from the appropriation of the available supply of food. Many individuals seek to attract birds in order to view birds and enjoy their habits. Squirrels and larger birds often interfere with this and, therefore, an electrified bird feeder of a portable nature for use on decks, patios or the like is needed.

There exists a large quantity of prior art with respect to the electrification of bird feeders, including U.S. Pat. No. 5,150,665 to Boaz, U.S. Pat. No. 5,191,857 to Boaz, U.S. Pat. No. 5,392,732 to Fry; U.S. Pat. No. 5,285,747 to Caldine; U.S. Pat. No. 5,471,951 to Collins; and U.S. Pat. No. 2,856,898 to Doubleday.

In all of the aforesaid prior art, the bird feeder is designed to be supported from a tree, or permanently in place support pole, thereby positioning the bird feeder off of the ground, but due to their cooperation with the support pole or the support mechanism extending downwardly from a tree, access by squirrels is still available and therefore the need developed in the prior art cited for an electrification means to prevent the squirrels from eating the feed intended for the birds.

Applicant's invention is designed for a portable guard having a harp device affixed thereon such that the bird feeder could depend downwardly from the harp device, a battery source or a power wire with a stepped down transformer would result in a positive or negative charge being directed to the harp and the opposite charge being directed towards the bird feeder, such that when dimensioned properly, a squirrel and not a bird would be of sufficient size to breach the gap and close the circuit thereby being temporarily subject to an electrical shock thereby preventing the squirrel from access to the bird feed.

SUMMARY OF THE INVENTION

A hanger harp formed of metal tubing having an upper tubing surface with an upstanding hook means affixed thereto and a downwardly depending hook means affixed thereto, the downwardly depending hook means for positioning of a bird feeder, the harp hanger having a battery source secured thereto and connected to the harp hanger and the bird feeder or, in the alternative, a direct power supply reduced in voltage and secured to the harp hanger and to the bird feeder, the harp hanger secured upon a portable pole and stand or from a securing means positioned on a patio, deck or the like.

OBJECTS OF THE INVENTION

It is an object of the present invention to provide an open electronic circuit system which can be incorporated into various bird feeders in order to deter squirrels or other animals from the bird feeders by means of an electrical shock.

It is another object of the present invention to provide a bird feeder having opposed charged contacts between the bird feeder itself and the support means for the bird feeder.

It is a still further object of the present invention to provide for a bird feeder which can be electrified by battery power or by direct current.

It is a still further object of the present invention to provide for a novel bird feeder which is free standing and portable for use on a deck, patio or the like, yet which still provides for an electronic circuit system which can be incorporated in order to deter squirrels and other animals from the bird feeders by means of an electrical shock.

BRIEF DESCRIPTION OF THE DRAWINGS

These and other objects of the present invention will become evident, particularly when taken with respect to the following illustrations wherein.

DETAILED DESCRIPTION OF THE DRAWINGS

Figure 1:
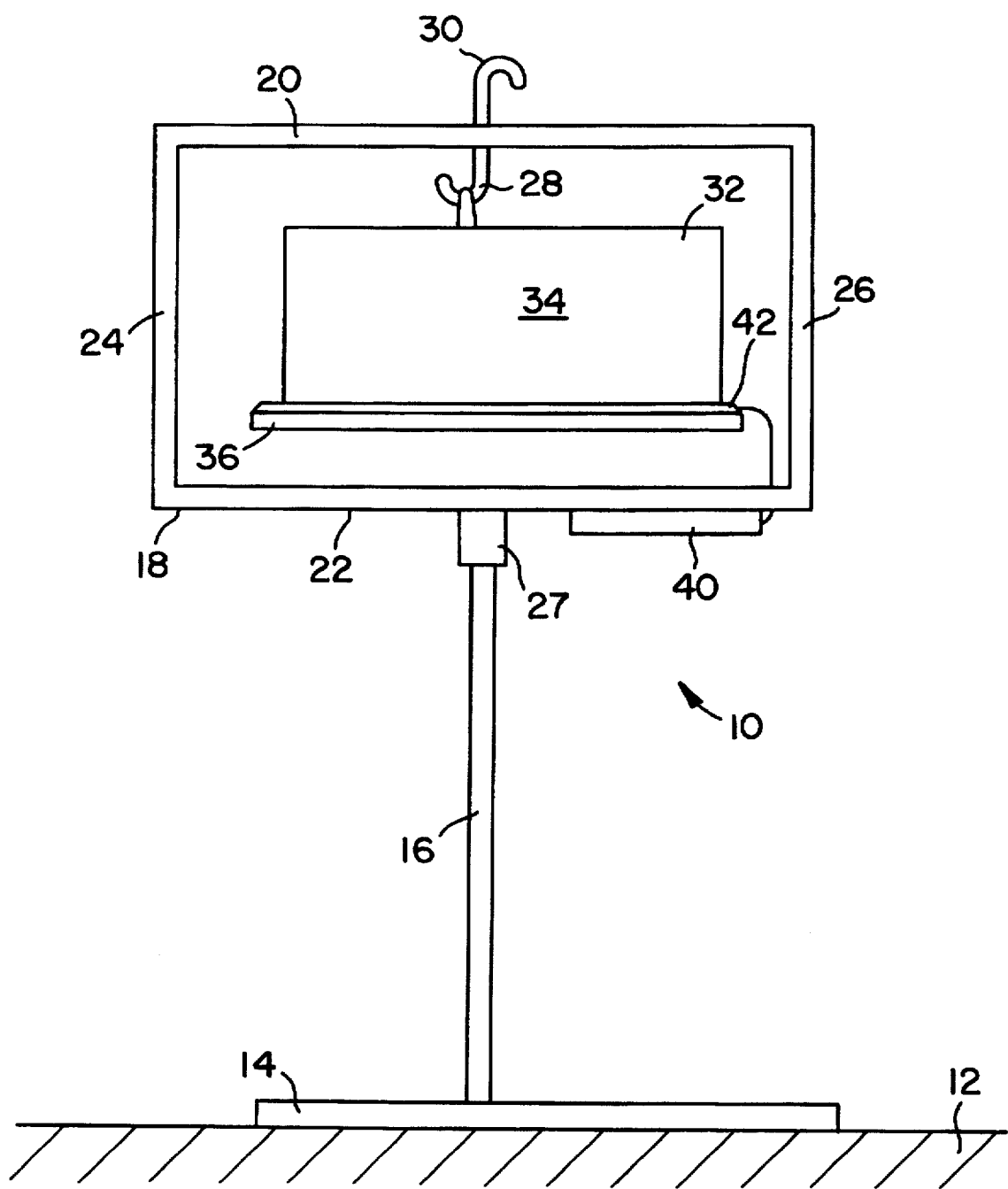
FIG. 1 is a front view of the bird feeder.

FIG. 1 illustrates a front view of a pest deterrent bird feeder of the type which would allow birds access to bird seed, but which would deter larger animals, such as squirrels or the like. In the embodiment illustrated in FIG. 1, there is disclosed a pest deterrent bird feeder 10 which is portable in nature. It is designed to rest on a deck or patio 12, the feeder having a base 14 and an upstanding support pole 16. Mounted on support pole 16 would be a frame or harp 18 which defines a support frame for securing the bird feeder. Frame or harp 18, as illustrated in FIG. 1, would be constructed of tubular members and have an upper and lower cross member 20 and 22 and opposing side members 24 and 26. The shape of the frame or harp 18 is one of choice and is illustrated as a substantial rectangle in FIG. 1, but could as easily be shaped and formed due to the tubular members, into a ring or polygonal shape.

Frame or harp 18 can be removably mounted onto support 16 by means of a depending locking support member 27 having a partial throughbore to allow it to slide over the upper end of support member 16.

Frame or harp member 18 has a depending hook 28 from upper member 20 and an upstanding hook 30 from upper member 20. Depending hook 28 is designed to removably secure a bird feeder 32 when frame or harp member 18 is used in conjunction with support base 14 and upstanding support 16. The upstanding hook 30 is designed for use when the frame or harp member 18 and bird cage 32 are desired to be hung from another location, such as from a tree limb or the like.

Bird feeder 32 can be any of a conventional type in which bird seed is introduced into a hopper portion 34, such that under the influence of gravity and the consumption of bird seed, the seed gravitates downwardly and outwardly onto tray 36 which provides an annular perch about the hopper 34. Typically, small birds will nest on the tray 36 and eat the bird seed as it gravitates downwardly and outwardly from hopper 34 onto tray 36.

In the present invention, a power source 40 would be mounted on frame or harp 18, the power source typically being a 9-volt battery pack. The negative electrode of power source 40 would be connected to the frame or harp 18 which would be constructed of a conductive material. The positive electrode of power source 40 would be connected to a strip of conductive tape or the like 42 which would be positioned about tray 36. In this mode, birds could safely nest on tray 36 and in fact nest directly on the conductive tape 42 without any harm and consume bird seed as previously described. However, in this configuration, a larger animal, such as a squirrel attempting to reach the bird seed in tray 36 would span the gap between frame or harp 18, connected to the negative electrode of power source 40 and the conductive tape 42 on tray 36, conducted to the positive electrode of power source 40. Thus, in doing so, the squirrel would complete a circuit and would be subjected to a minor shock which would deter the squirrel from remaining in this position and thus preventing the squirrel from obtaining or consuming the bird seed in tray 36.

The bird feeder 10 as illustrated in FIG. 1 would be designed to be located on a patio, deck or the like, such that the individual supplying the bird seed could view the birds in their feeding mode. Because of the location of a bird feeder in such proximity to a home, the independent power source 40 comprising a battery, such as a 9-volt battery, could be substituted with an external power supply, such as 115 volts from the dwelling supply with a step-down transformer reducing it to the neighborhood of 9–10 volts, such that no harm would come to the animals, but rather, they would receive a minor shock in order to deter them from consuming the feed meant for the birds.

The harp or frame 18 can also be removed from base 14 and support pole 16 and hung from a separate location by means of upstanding hook 30. Power source 40, in the form of a 9-volt battery would operate in the same manner as if the harp or frame and bird feeder were mounted on the support base 14 and support pole 16. Depending upon the distance from the dwelling unit or the distance from an external power supply, the use of current from the dwelling unit through a step-down transformer may or may not be feasible, but is an option available to the user.

Figure 2:
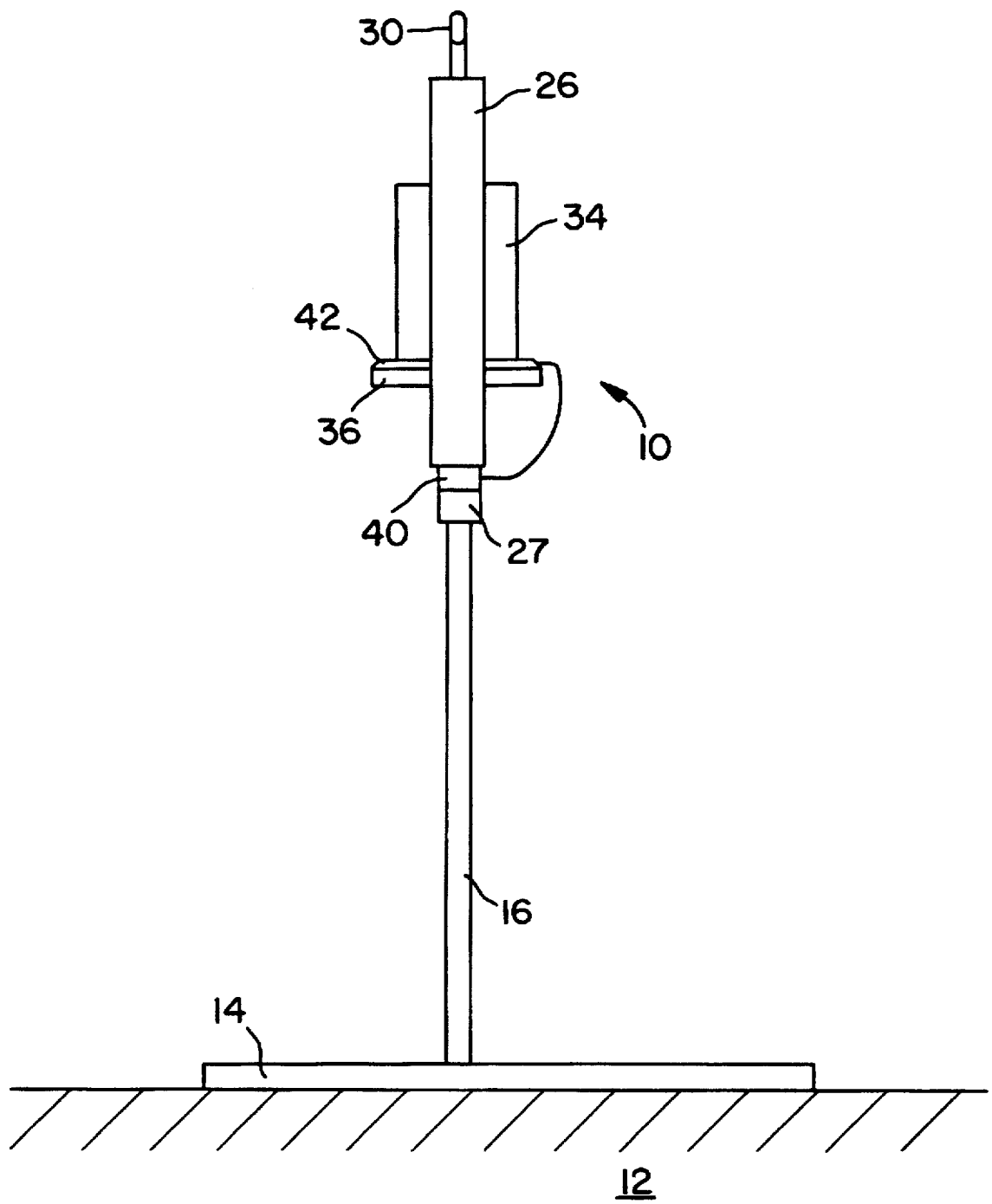
FIG. 2 is a side view of the bird feeder.

FIG. 2 is a side view of the bird feeder as illustrated in FIG. 1, again illustrating the relevant dimensions and positioning of the various elements which would permit the use of the bird feeder by birds without any side effects, yet which would deter larger animals, such as squirrels, from invading the food source for the birds.

While the various preferred embodiments have been shown and described, it will be understood that there is no intent to limit the invention by such disclosure, but rather, is intended to cover all modifications and alternate constructions falling within the spirit and scope of the invention as defined by the appended claims.

I claim:

1. An electrical shock frame and bird feeder comprising:

a bird feeder;

a frame constructed of a conductive material, said frame formed in a geometric shape, said geometric shape having a top and a bottom, said top of said frame having an upstanding securing means for hanging said frame, said top of said frame having a depending securing means for securing said bird feeder, said geometric shape of said frame dimensioned to encircle said bird feeder, said frame further having a securing means positioned on said bottom side for mounting said frame on a pedestal;

a power source;

an open electronic circuit means for producing an electrical shock interconnected between a conductive portion of said conductive frame and a conductive portion of said bird feeder whereby one of said conductive portions forms a positive contact and the other said conductive portion forms a negative contact such that an electrical shock will result when both positive and negative contacts are simultaneously engaged.

2. The invention of claim 1 wherein said power source comprises a battery pack secured to said frame.

3. The invention of claim 1 wherein said power source comprises a connection to alternating current.

* * * * *